US011565757B2

(12) United States Patent
Qian et al.

(10) Patent No.: US 11,565,757 B2
(45) Date of Patent: Jan. 31, 2023

(54) REINFORCEMENT ELEMENT

(71) Applicant: SIKA TECHNOLOGY AG, Baar (CH)

(72) Inventors: Xuping Qian, Novi, MI (US);
Raymond Helferty, Macomb, MI (US);
Michael Niezur, Southfield, MI (US)

(73) Assignee: SIKA TECHNOLOGY AG, Baar (CH)

( * ) Notice: Subject to any disclaimer, the term of this patent is extended or adjusted under 35 U.S.C. 154(b) by 562 days.

(21) Appl. No.: 16/606,092

(22) PCT Filed: Apr. 18, 2018

(86) PCT No.: PCT/EP2018/059848
§ 371 (c)(1),
(2) Date: Oct. 17, 2019

(87) PCT Pub. No.: WO2018/192946
PCT Pub. Date: Oct. 25, 2018

(65) Prior Publication Data
US 2020/0130749 A1 Apr. 30, 2020

(30) Foreign Application Priority Data
Apr. 21, 2017 (EP) ..................................... 17167611

(51) Int. Cl.
B62D 25/00 (2006.01)
B62D 27/02 (2006.01)
B62D 29/04 (2006.01)

(52) U.S. Cl.
CPC ........... *B62D 25/00* (2013.01); *B62D 27/026* (2013.01); *B62D 29/043* (2013.01)

(58) Field of Classification Search
CPC .... B62D 25/00; B62D 27/026; B62D 29/043; B62D 29/002; B62D 29/004
See application file for complete search history.

(56) References Cited

U.S. PATENT DOCUMENTS 6,247,287 B1    6/2001   Takabatake
6,387,470 B1    5/2002   Chang et al.
(Continued)

FOREIGN PATENT DOCUMENTS

CN    106542002 B    11/2020
EP    1 084 816 A2    3/2001
(Continued)

OTHER PUBLICATIONS

Jul. 4, 2018 Search Report issued in International Patent Application No. PCT/EP2018/059848.
(Continued)

*Primary Examiner* — Brian Handville
(74) *Attorney, Agent, or Firm* — Oliff PLC

(57) ABSTRACT

A reinforcement element has a carrier having a longitudinal axis and elongate opening extending in the axis direction. The reinforcement element has an insert element having a longitudinal axis constructed to be arranged in the elongate opening. The insert element has first and second portions. The first portions are parallel with a first plane. The insert element longitudinal axis is in this first plane. The second portions are parallel with a second plane. The insert element longitudinal axis is in the second plane. The reinforcement element has a first adhesive which can be arranged on the carrier outer side and on a first group of insert element first portions and to bond the carrier and insert element in the structural element. The reinforcement element has a second adhesive which can be arranged on a second group of insert element first portions and to bond the insert element in the carrier.

17 Claims, 3 Drawing Sheets

(56) References Cited

U.S. PATENT DOCUMENTS

| | | |
|---|---|---|
| 6,471,285 B1 | 10/2002 | Czaplicki et al. |
| 6,729,425 B2 | 5/2004 | Schneider et al. |
| 7,673,433 B2 * | 3/2010 | Rutman ............ E04C 3/08 52/843 |
| 8,011,721 B2 | 9/2011 | Yamada et al. |
| 8,530,015 B2 * | 9/2013 | Mendiboure ........ B62D 29/002 428/35.8 |
| 2008/0296164 A1 | 12/2008 | Dajek et al. |
| 2009/0085379 A1 | 4/2009 | Takahashi et al. |
| 2009/0108626 A1 | 4/2009 | Richardson et al. |
| 2009/0229219 A1 * | 9/2009 | Rutman ............ E04C 3/08 52/836 |
| 2010/0092733 A1 | 4/2010 | Blank et al. |
| 2011/0049323 A1 | 3/2011 | Belpaire et al. |
| 2011/0189428 A1 * | 8/2011 | Belpaire ........... B62D 29/002 428/192 |
| 2012/0141724 A1 | 6/2012 | Belpaire et al. |
| 2012/0207986 A1 | 8/2012 | Belpaire et al. |
| 2014/0237941 A1 | 8/2014 | Richardson et al. |

FOREIGN PATENT DOCUMENTS

| | | |
|---|---|---|
| EP | 2 154 052 A1 | 2/2010 |
| JP | 2010-036696 A | 2/2010 |
| WO | 03/000535 A1 | 1/2003 |
| WO | 2008/014250 A1 | 1/2008 |
| WO | 2010/054194 A1 | 5/2010 |
| WO | 2013/082238 A1 | 6/2013 |
| WO | 2015/054836 A1 | 4/2015 |
| WO | 2015/061291 A1 | 4/2015 |

OTHER PUBLICATIONS

Dec. 16, 2021 Notice of Opposition issued in European Patent Application No. 18717933.8.

* cited by examiner

REINFORCEMENT ELEMENT

The invention relates to a reinforcement element for reinforcing structural elements in vehicles. Furthermore, the invention relates to vehicles with structural elements, which are reinforced by means of a reinforcement element.

In many cases, structural elements, such as, for example, chassis and/or frames of transport and locomotion means, in particular of vehicles for water or land or aircraft, have structures with hollow spaces in order to enable lightweight constructions. However, these hollow spaces bring about extremely different problems. Depending on the type of hollow space, in order to prevent the penetration of moisture and dirt, which can lead to corrosion of the structural elements, the space has to be sealed. It is also often desirable to significantly reinforce the hollow spaces and consequently the structural element, but to maintain the low weight. Often, it is also necessary to stabilize the hollow spaces and consequently the structural elements in order to reduce noises which would otherwise be transmitted along or through the hollow space. Many of these hollow spaces have an irregular shape or a narrow dimension, whereby it is made more difficult to correctly seal, reinforce and attenuate them.

In particular in automotive construction, but also in aircraft and boat construction, therefore, baffles are used in order to seal and/or acoustically seal off hollow spaces, or reinforcers are used in order to reinforce hollow spaces.

In FIG. 1, a chassis of an automobile is schematically illustrated. The bodywork 10 has in this instance different structures with hollow spaces, such as, for example, pillars 14 and carriers or struts 12. Such structural elements 12, 14 with hollow spaces are generally sealed or reinforced using sealing and/or reinforcement elements 16.

In FIG. 2, a known concept for sealing and/or reinforcing such structural elements with hollow spaces in motor vehicles is schematically illustrated. In this instance, FIG. 2 shows an insulation element 16 in a structural element 12, 14 prior to an expansion of an expandable material 13. In this example, the expandable material 13 is arranged on surfaces of a carrier element 11, which are arranged close to the structural element 12, 14. The carrier element 11 has in this embodiment an M- or W-shaped cross-section. A rigidity of the carrier element 11 is thereby increased.

This carrier element 11 or the insulation element 16 according to the prior art is constructed in cross-section in such a manner that it can be produced in a simple manner with an injection-molding method. To this end, adjacent faces of the carrier element 11 are constructed at an angle 15 which is slightly greater than 90°. As a result of such a configuration of the cross-section of the carrier element 11, the injection-molded carrier element 11 can be simply removed from the mold of the injection-molding machine A surface of the carrier element 11 which in each case faces an inner side of the structural element 12, 14 typically has a chessboard-like form. In this instance, the connection material or the expandable material 13 may in each case be arranged only on faces which are arranged close to the structural element 12, 14.

In order to further reinforce such reinforcement elements 16, a plurality of improvements have already been proposed. Thus, US 2014/0237941 A1 discloses, for example, a reinforcement element with a U-shaped insert. In this instance, this U-shaped insert is integrated in the reinforcement element in such a manner that it can be made more resistant to mechanical loads at specific locations. Another approach is carried out in US 2009/0085379 A. In this instance, three elements which are located beside each other are combined to form a reinforcement element.

A disadvantage of previously known reinforcement elements is that, on the one hand, the mechanical stability thereof for specific applications, in particular in the field of crash-relevant structures, leaves further room for improvement. On the other hand, the known solutions have the disadvantage that connection locations for the adhesive in order to adhesively bond the reinforcement element to the structural element provide few faces at important locations of the reinforcement element.

An object of the invention is therefore to provide an improved reinforcement element which has an improved mechanical stability, in particular in order to be able to better reinforce crash-relevant structures on a vehicle. In addition, the reinforcement element according to the invention should be able to be produced in a cost-effective manner and installed in vehicles in a simple manner.

This object is achieved with a reinforcement element for reinforcing structural elements in vehicles, wherein the reinforcement element first comprises a carrier having a longitudinal axis. In this instance, the carrier has at least one elongate opening which extends in the direction of the longitudinal axis. The reinforcement element further comprises at least one insert element which has a longitudinal axis and which is constructed to be arranged in the elongate opening of the carrier. The insert element has in this instance a plurality of first portions and a plurality of second portions. The first portions are parallel with a first plane, wherein the longitudinal axis of the insert element is located in this first plane. The second portions are parallel with a second plane, wherein the longitudinal axis of the insert element is located orthogonally to this second plane. The reinforcement element further comprises a first adhesive which can be arranged on an outer side of the carrier and on a first group of first portions of the insert element and which is constructed to adhesively bond the carrier and the insert element in the structural element. Furthermore, the reinforcement element comprises a second adhesive which can be arranged on a second group of first portions of the insert element and which is constructed to adhesively bond the insert element in the carrier.

This solution has the advantage that as a result of insert elements which are adhesively bonded in this manner to the structural element and the carrier, a very high mechanical stability of the reinforcement element can be achieved. In this instance, the insert element is not only connected to the carrier in order to reinforce it, but instead the insert element can itself also be adhesively bonded directly to the structural element so that an additional mechanical stabilization of the overall system can be carried out.

A core notion of the present invention involves, as a result of the provision of separate elements, that is to say, the carrier and the insert element, there being able to be produced geometries of the reinforcement element which would not be able to be produced by means of an individual element or only with great difficulty. As a result of nesting and connecting the carrier with respect to the insert element, on the one hand, a direct reinforcement of the carrier can be achieved and, on the other hand, as a result of additional surfaces of the insert element which are configured so as to be able to be adhesively bonded directly to the structural element, a connection face between the reinforcement element and structural element can be increased, which results in an increase of the overall stability or the mechanical durability of the overall system.

In an exemplary embodiment, the carrier and/or the insert element is/are formed from sheet metal.

In an alternative embodiment, the carrier and/or the insert element is/are formed from plastics material, in particular polyamide.

In another exemplary embodiment, the carrier and insert element are not formed from the same material, wherein the carrier may be formed from sheet metal and the insert element from plastics material or the carrier may be formed from plastics material and the insert element from sheet metal.

Depending on the demands on the reinforcement element, an advantageous material selection may be made in this instance. Depending on which of the factors weight, costs and mechanical stability may be weighted more highly for a respective application, another material combination may be advantageous.

For applications in which a level of mechanical stability which is as high as possible is intended to be achieved, a carrier of sheet metal is advantageously combined with an insert element of sheet metal.

In an exemplary embodiment, the carrier and/or the insert element are constructed integrally.

The provision of integrally constructed elements for the reinforcement element affords the advantage that a mechanical durability can thereby be further increased. Integral elements may in the case of plastics material elements, for example, be obtained by means of injection-molding methods and, in the case of metal sheets, the integral elements may be achieved by corresponding bending of metal sheets.

In an exemplary embodiment, the carrier has bends which extend along the longitudinal axis of the carrier.

The provision of such longitudinally extending bends has the advantage that elongate openings which can receive the insert element in an ideal manner can thereby be formed.

The term "bending" comprises in connection with this invention both directional changes which have actually been produced by means of a bending method and directional changes in surfaces which have been produced by means of other production methods.

In an exemplary embodiment, the insert element has bends which extend transversely relative to the longitudinal axis of the insert element.

The formation of such bends which extend transversely has the advantage that the insert element thereby has portions which extend transversely relative to portions of the carrier so that a mechanical stability of the overall system can be optimized. In particular as a result of such bends, portions of the insert element which are ideally suitable for adhesively bonding the insert element to the carrier and to the structural element are produced.

In an exemplary embodiment, the carrier has a meandering cross-section relative to the longitudinal axis thereof. In this instance, a number of bends, which lead to such a meandering cross-section, may be constructed differently.

In an advantageous development, the carrier has an M-shaped cross-section with respect to the longitudinal axis thereof. In this embodiment, the carrier has six bends so that three elongate openings are produced.

In alternative embodiments, the carrier has less but also more than six bends so that a different number of elongate openings may also be present.

However, embodiments in which the carrier has an uneven number of elongate openings are particularly preferred.

In an exemplary embodiment, the insert element has a meandering longitudinal section with respect to the longitudinal axis thereof.

The provision of such a meandering longitudinal section of the insert element has the advantage that portions of the insert element which extend transversely relative to portions of the carrier are thereby formed. This provides a particularly high level of mechanical stability of the overall system comprising the carrier and insert element.

In an exemplary embodiment, the carrier and/or the insert element has/have at least one hole.

The provision of such holes in the carrier and/or in the insert element affords the advantage that an overall weight of the reinforcement element can thereby be reduced, that a flow of coating fluid through the structural element with the reinforcement element inserted can be improved and that other specific claims can be taken into account in the production of the reinforcement element.

In an exemplary embodiment, the carrier has a plurality of elongate openings which each extend in the direction of the longitudinal axis and the reinforcement element comprises a plurality of insert elements which are each constructed to be arranged in the elongate openings of the carrier.

The provision of a plurality of elongate openings and a plurality of insert elements which can be arranged therein affords the advantage that a further improvement of the mechanical stability of the reinforcement element can thereby be achieved. As a result of the provision of a plurality of elongate openings, the carrier may in particular be constructed in such a manner that in a loading direction it already has an increased level of stability per se, for example, as a result of the provision of a meandering cross-section.

In an exemplary embodiment, the first adhesive and the second adhesive are different adhesives. In an alternative embodiment, the first adhesive and the second adhesive are identical adhesives.

Depending on the intended application, a suitable adhesive composition may be selected for the first or the second adhesive. If primarily a structural reinforcement is the priority, it is advantageous not to expand the adhesives or only to a limited extent. An increased mechanical stability is thereby achieved. For example, for such intended applications, an adhesive which can be obtained under the trade name SikaPower 960 can be used. This adhesive has no or substantially no foaming properties so that a mechanically very stable connection between the carrier element and structural element can be produced.

In another embodiment, for such intended applications an expandable material which can be obtained under the trade name SikaReinforcer 911-PB can be used. This expandable material has, in spite of the foaming properties thereof, a very high level of mechanical stability and additionally affords the advantage that, as a result of the foaming, gaps can be overcome or hollow spaces can be closed.

Another example of such an expandable material with reinforcement properties is SikaReinforcer® 941, which is marketed by Sika Corp., USA. This adhesive is described in U.S. Pat. No. 6,387,470.

If, in contrast, the insulation or sealing of hollow spaces is the priority, an adhesive which has a significantly higher expansion rate can be selected. For such applications, it is of primary importance to reliably close hollow spaces. This is advantageously achieved by highly expandable adhesives. For example, for such an intended application, a more powerfully expandable material which can be obtained under the trade name SikaBaffle 450 can be used. This more powerfully expandable material affords the advantage that during the foaming larger gaps can thereby be overcome or larger hollow spaces can be closed.

In a similar manner to the expansion behavior of the adhesive, the hardening behavior of the connection material can also be selectively adapted to the respective application.

In an exemplary embodiment, the first adhesive is constructed to be expandable. In a preferred development, the first adhesive is constructed to be expandable by means of an action of heat. In a preferred development, the first adhesive is further constructed to be able to be hardened by means of an action of heat.

The first adhesive may in this instance, for example, have an expansion rate between 100% and 1000%.

In an alternative embodiment, the first adhesive is not constructed to be expandable. In such an embodiment, the first adhesive is either pumped into an intermediate space between the reinforcement element and structural element or the reinforcement element is adhesively bonded in the open structural element, wherein the structural element is closed only after inserting the reinforcement element. Non-expandable adhesives afford the advantage that they generally have a higher level of mechanical stability than expandable adhesives.

However, expandable adhesives afford the advantage that the introduction and adhesive bonding of the reinforcement element in the structural element can be configured in a simpler and more cost-effective manner.

In an exemplary embodiment, the second adhesive is constructed so as to be non-expandable.

A non-expandable second adhesive affords the advantage that the insert element can be adhesively bonded to the carrier in the most stable manner possible.

In an alternative embodiment, the second adhesive is constructed to be expandable. In an advantageous development, the expansion of the second adhesive is between 50 and 300%.

The term "non-expandable" includes in connection with this invention processes in which a volume either does not change at all or increases or decreases by a maximum of plus or minus 10% of the starting volume.

In an exemplary embodiment, the insert element does not protrude over outer faces of the carrier when the insert element is arranged in the opening of the carrier.

Insert elements or carriers which are sized in this manner afford the advantage that the reinforcement element can be constructed in a compact manner and thereby in the most mechanically stable manner possible.

In an advantageous development, the insert element which is arranged in the carrier is flush with the outer faces of the carrier.

This has the advantage that the most closed outer surface possible of the reinforcement element can thereby be achieved.

In addition, a vehicle having a structural element is proposed here, wherein the structural element is reinforced with a reinforcement element which is described herein can be achieved.

Details and advantages of the invention will be described below with reference to embodiments and with reference to schematic drawings.

Figure 1:
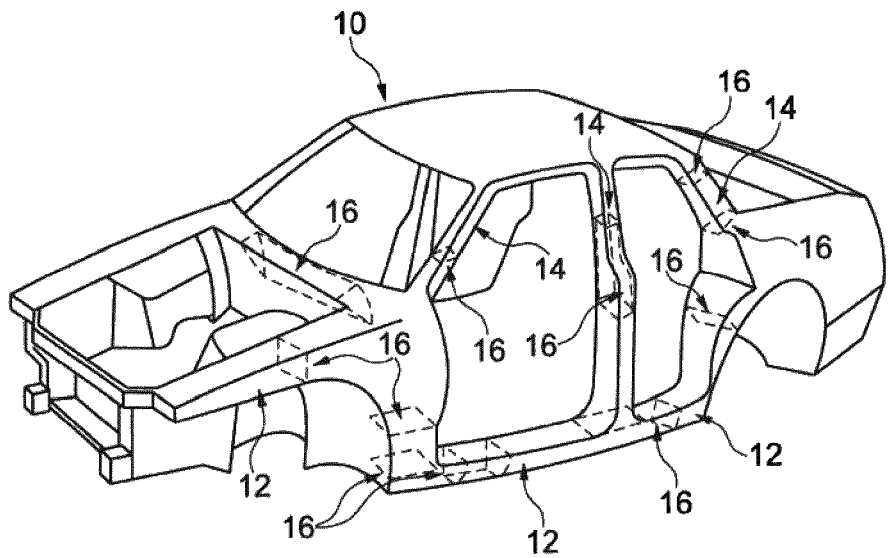
FIG. 1 is an exemplary illustration of a chassis according to the prior art.
Figure 2:
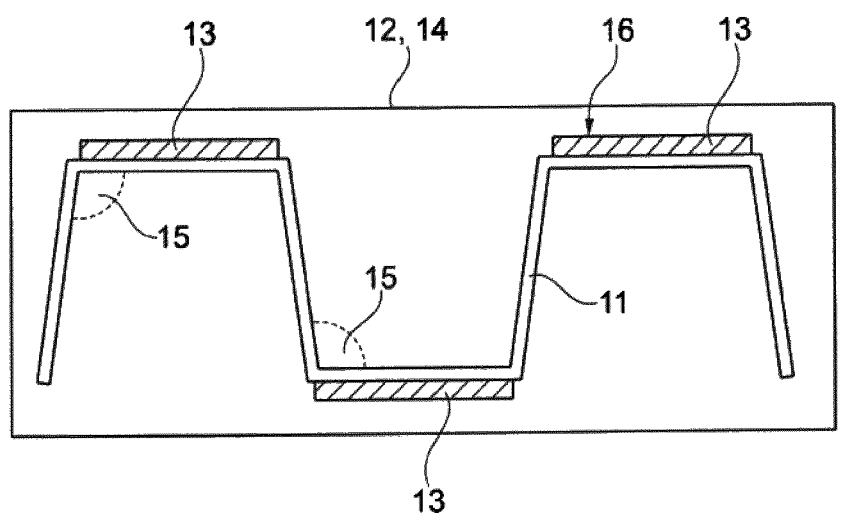
FIG. 2 is a schematic illustration to explain an exemplary reinforcement element in a structural element according to the prior art.
Figure 3A:
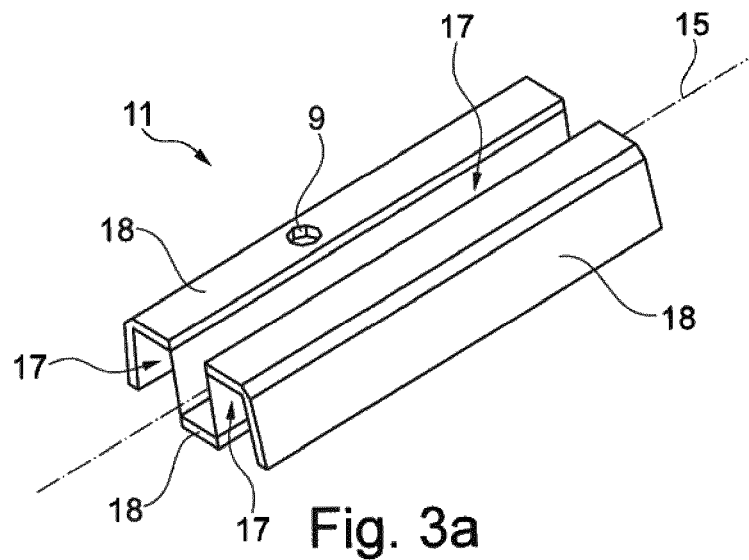
FIG. 3a is a schematic illustration of an exemplary carrier.

In FIG. 3a, an exemplary carrier 11 is illustrated. The carrier 12 has a longitudinal axis 15. In this embodiment, the carrier 11 has bends which extend along the longitudinal axis 15 so that the carrier 11 has a meandering cross-section with respect to the longitudinal axis 15 thereof. In this embodiment, the carrier 11 has an M-shaped cross-section with respect to the longitudinal axis 15 thereof. This results in the carrier 11 having three elongate openings 17.

In this embodiment, a first adhesive 18 is arranged on an entire outer face of the carrier 11. In an alternative embodiment which is not illustrated, the first adhesive 18 is arranged only on part-regions of the outer face of the carrier 11.

In addition, the carrier 11 has a hole 9 in a portion. This hole 9, on the one hand, makes the carrier lighter and, on the other hand, enables fluids to flow through the hole 9 which is particularly advantageous in the event of immersion painting of the structural element with the reinforcement element inserted.

Figure 3B:
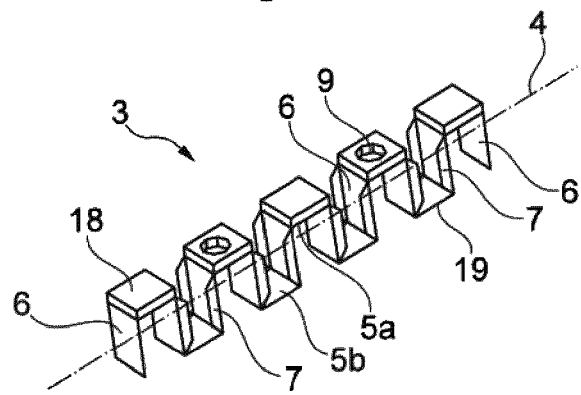
FIG. 3b is a schematic illustration of an exemplary insert element.
Figure 3C:
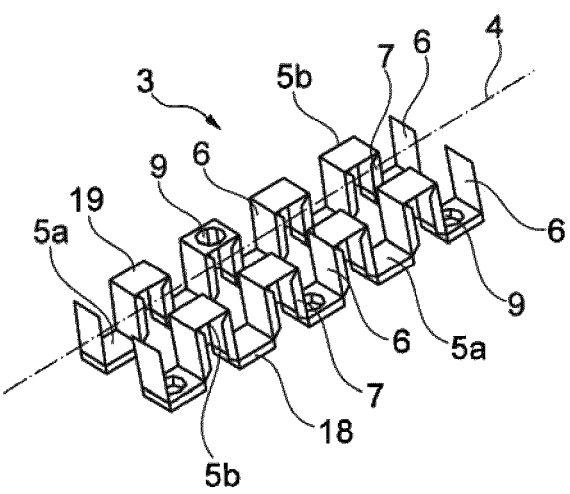
FIG. 3c is a schematic illustration of exemplary insert elements.

In FIGS. 3b and 3c, insert elements 3 are illustrated in each case. The insert element 3 illustrated in FIG. 3b is in this instance provided for introduction into the central opening 17 of the carrier 11 in FIG. 3a. The two insert elements in FIG. 3c are in this instance provided for introduction into the two outer openings 17 of the carrier 11 in FIG. 3a.

In this embodiment, the insert elements are constructed identically in FIGS. 3b and 3c. In an alternative embodiment which is not illustrated, insert elements 3 may also be constructed differently.

The insert elements 3 illustrated in FIGS. 3b and 3c each have bends which extend transversely relative to a longitudinal axis 4 of the insert elements 3. This leads to a meandering longitudinal section of the insert elements 3. In this instance, the insert elements 3 are subdivided by the bends into different portions. In each case, the first adhesive 18 or a second adhesive 19 is arranged on the first portions 5a, 5b. In this instance, the first adhesive 18 is arranged on a first group 5a of first portions of the insert element 3 and the second adhesive 19 is arranged on a second group 5b of first portions of the insert element 3. Insert elements 3 are now arranged in the carrier 11 according to FIG. 3a in such a manner that the first adhesive 18 comes to rest at the outer side in order to adhesively bond the insert elements to the structural element 12, 14 and the second adhesive 19 comes to rest at the inner side in order to adhesively bond the insert elements 3 to the carrier 11.

The insert elements 3 have holes 9 at different portions. These holes 9 reduce, on the one hand, a weight of the insert elements 3 and, on the other hand, improve a liquid throughflow in the event of immersion painting of the structural element with the reinforcement element inserted.

The insert elements 3 in the example according to FIGS. 3b and 3c alternately have first portions 5a, 5b and second portions 6. In this instance, the first portions 5a, 5b are located parallel with a first plane, wherein the longitudinal axis 4 of the insert element 3 is located in this first plane. The second portions 6 are located in this instance parallel with a second plane, wherein the longitudinal axis 4 of the insert element 3 is located orthogonally with respect to this second plane. This arrangement of first portions 5a, 5b and second portions 6 preferably on the one hand an ideal adhesive bonding of the insert element 3 to the carrier 11 and the structural element and, on the other hand, a significant improvement of the mechanical stability of the reinforcement element as a result of the second portions 6 which are located transversely relative to the walls of the carrier 11.

Figure 4:
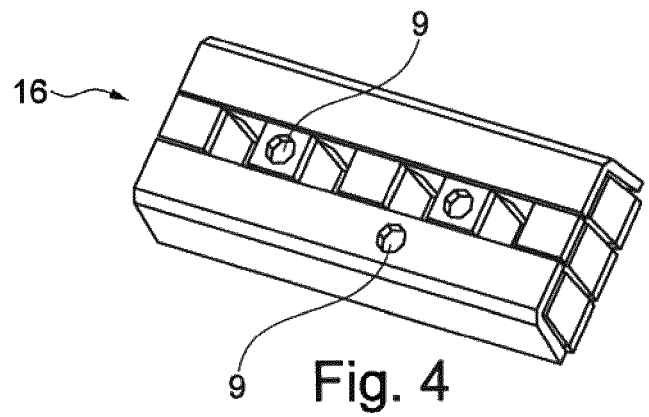
FIG. 4 is a schematic illustration of an exemplary reinforcement element.

FIG. 4 shows a reinforcement element 16 which in this embodiment comprises a carrier 11 according to FIG. 3a with three openings 17 and comprises three insert elements 3 according to FIGS. 3b and 3c which are arranged in each case in the openings 17 of the carrier 11. In this illustration of the reinforcement element 16, it can be seen that, as a result of the provision of insert elements 3 with first portions 5a, 5b and second portions 6 in openings of the carrier element 11, a very compact reinforcement element 16 which additionally has an increased outer surface for adhesive-bonding to the structural element is produced.

Figure 5:
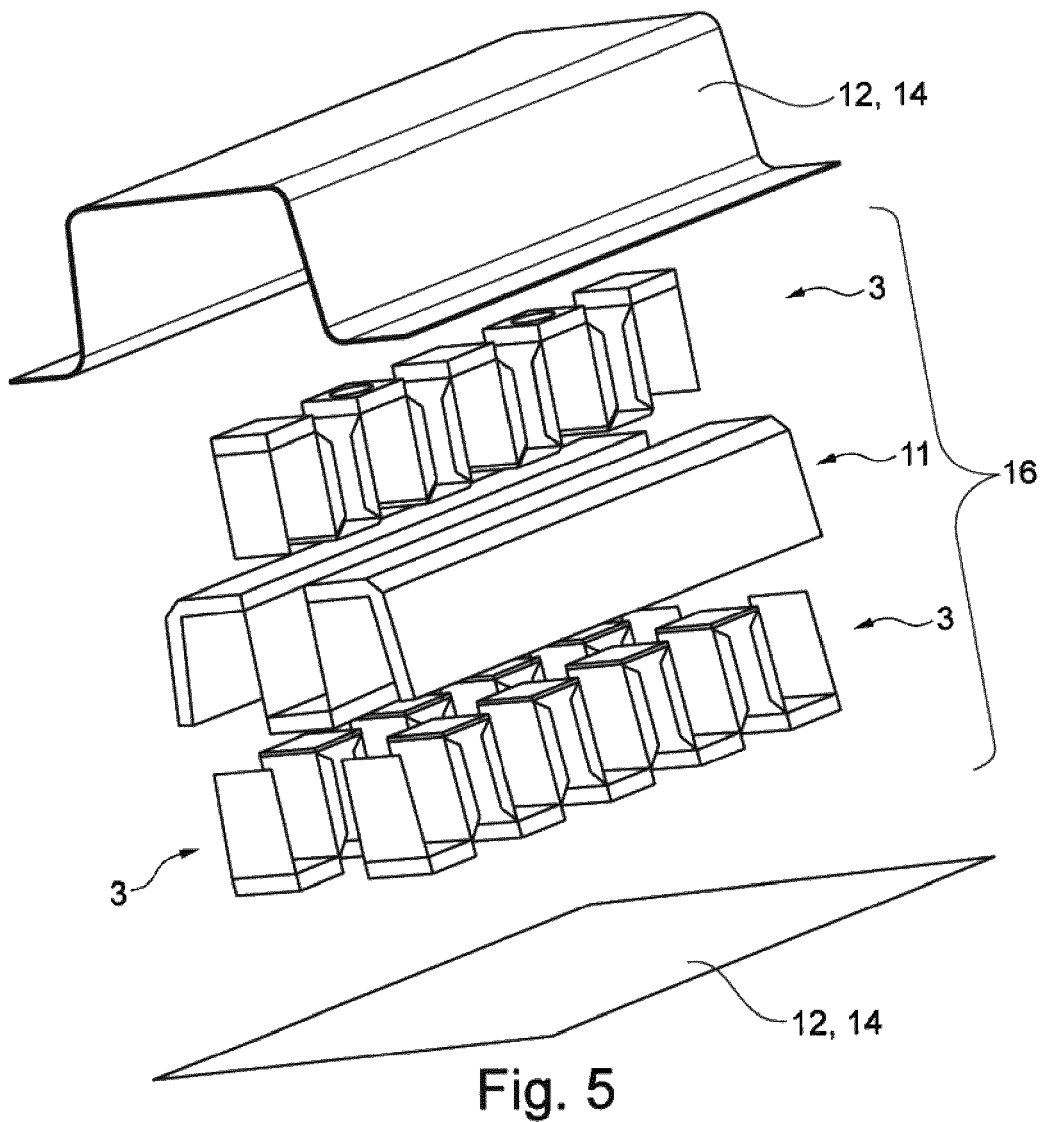
FIG. 5 is a schematic exploded illustration of an exemplary reinforcement element in an exemplary structural element.

In FIG. 5, the reinforcement element 16 in a structural element 12, 14 is shown in an exploded view. In this instance, the insert elements 3 and the carrier 11 of the reinforcement element 16 are also illustrated.

LIST OF REFERENCE NUMERALS

3 Insert element
4 Longitudinal axis of the insert element
5a First group of the first portions of the insert element
5b Second group of the first portions of the insert element
6 Second portions of the insert element
7 Flange
9 Hole
10 Bodywork
11 Carrier
12 Struts (structural element)
13 Adhesive
14 Pillar (structural element)
15 Longitudinal axis of the carrier
16 Reinforcement element
17 Opening of the carrier
18 First adhesive
19 Second adhesive

The invention claimed is:

1. A reinforcement element for reinforcing structural elements in vehicles, the reinforcement element comprising:
a carrier configured to be arranged in a reinforcing structural element and having a longitudinal axis, the carrier having at least one elongate opening that extends in a direction of the longitudinal axis of the carrier;
at least one insert element configured to be arranged in the at least one elongate opening of the carrier and having a longitudinal axis, the insert element comprising a plurality of first portions and a plurality of second portions, the first portions being arranged in parallel with a first plane, the longitudinal axis of the insert element being located in the first plane, the second portions being arranged in parallel with a second plane, the longitudinal axis of the insert element being located orthogonally to the second plane;
a first adhesive arranged on an outer side of the carrier and on a first group of the first portions of the insert element and configured to adhesively bond the carrier and the insert element in the reinforcing structural element; and
a second adhesive arranged on a second group of the first portions of the insert element and configured to adhesively bond the insert element in the carrier.

2. The reinforcement element as claimed in claim 1, wherein at least one of the carrier and the insert element is formed from sheet metal.

3. The reinforcement element as claimed in claim 1, wherein at least one of the carrier and the insert element is formed from plastics material.

4. The reinforcement element as claimed in claim 1, wherein at least one of the carrier and the insert element are constructed integrally.

5. The reinforcement element as claimed in claim 1, wherein the carrier includes bends which extend along the longitudinal axis of the carrier.

6. The reinforcement element as claimed in claim 1, wherein the insert element includes bends which extend transversely relative to the longitudinal axis of the insert element.

7. The reinforcement element as claimed in claim 1, wherein the carrier has a meandering cross-section relative to the longitudinal axis of the carrier.

8. The reinforcement element as claimed in claim 7, wherein the carrier has an M-shaped cross-section with respect to the longitudinal axis of the carrier.

9. The reinforcement element as claimed in claim 1, wherein the insert element includes a meandering longitudinal section with respect to the longitudinal axis of the insert element.

10. The reinforcement element as claimed in claim 1, wherein at least one of the carrier and the insert element includes a hole.

11. The reinforcement element as claimed in claim 1, wherein the carrier includes a plurality of elongate openings that each extend in the direction of the longitudinal axis of the carrier, and
the reinforcement element comprises a plurality of insert elements that are each configured to be arranged in respective elongate openings of the carrier.

12. The reinforcement element as claimed in claim 1, wherein the first adhesive is configured to be expandable.

13. The reinforcement element as claimed in claim 1, wherein the second adhesive is configured to be non-expandable.

14. The reinforcement element as claimed in claim 1, wherein the insert element does not protrude over the carrier when the insert element is arranged in the elongate opening of the carrier.

15. A vehicle having a structural element, wherein the structural element is reinforced with a reinforcement element as claimed in claim 1.

16. The reinforcement element as claimed in claim 1, wherein the carrier has a waveform cross-section relative to the longitudinal axis of the carrier and the insert element includes a waveform longitudinal section with respect to the longitudinal axis of the insert element, and
a direction of the waveform cross-section of the carrier is orthogonal to a direction of the waveform longitudinal section of the insert element.

17. A reinforcement system for reinforcing structural elements in vehicles, the reinforcement system comprising:
a reinforcing structural element; and
a reinforcement element comprising:
a carrier configured to be arranged in the reinforcing structural element and having a longitudinal axis, the carrier having at least one elongate opening that extends in a direction of the longitudinal axis of the carrier;

at least one insert element configured to be arranged in the at least one elongate opening of the carrier and having a longitudinal axis, the insert element comprising a plurality of first portions and a plurality of second portions, the first portions being arranged in parallel with a first plane, the longitudinal axis of the insert element being located in the first plane, the second portions being arranged in parallel with a second plane, the longitudinal axis of the insert element being located orthogonally to the second plane;

a first adhesive arranged on an outer side of the carrier and on a first group of the first portions of the insert element and configured to adhesively bond the carrier and the insert element in the reinforcing structural element; and a second adhesive arranged on a second group of the first portions of the insert element and configured to adhesively bond the insert element in the carrier.

* * * * *